(12) United States Patent
DSouza et al.

(10) Patent No.: US 12,504,976 B2
(45) Date of Patent: Dec. 23, 2025

(54) HYBRID BOOT FOR SYSTEM REIMAGING

(71) Applicant: Microsoft Technology Licensing, LLC, Redmond, WA (US)

(72) Inventors: Jade Megan DSouza, Seattle, WA (US); Alexey Altoukhov, Carnation, WA (US); Andrew Micheal Relyea, Seattle, WA (US); Sun Kim Davey, Auburn, WA (US); Donghoon Park, Sammamish, WA (US); Haris Farhan Mohammad, Kirkland, WA (US); Oleg Surmachev, Arlington, WA (US); Vishwa Shobhit Sahay, Redmond, WA (US); Alexander Geoffrey Howells, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 16 days.

(21) Appl. No.: 18/492,568

(22) Filed: Oct. 23, 2023

(65) Prior Publication Data

US 2025/0130812 A1    Apr. 24, 2025

(51) Int. Cl.
*G06F 15/177* (2006.01)
*G06F 9/4401* (2018.01)

(52) U.S. Cl.
CPC .......... *G06F 9/4401* (2013.01); *G06F 9/4406* (2013.01)

(58) Field of Classification Search
CPC ...................................................... G06F 9/4401
USPC ............................................................. 713/2
See application file for complete search history.

(56) References Cited

U.S. PATENT DOCUMENTS

| | | | |
|---|---|---|---|
| 9,064,117 B1 * | 6/2015 | Worsley | G06F 9/441 |
| 9,537,745 B1 * | 1/2017 | Halcrow | G06F 3/0664 |
| 9,934,050 B2 * | 4/2018 | Shih | H04L 41/0806 |
| 10,037,201 B2 * | 7/2018 | Herzi | G06F 21/602 |
| 11,921,875 B1 * | 3/2024 | Zircher | G06F 21/6218 |
| 12,093,368 B1 * | 9/2024 | Zircher | G06F 21/6218 |

(Continued)

OTHER PUBLICATIONS

International Search Report and Written Opinion received for PCT Application No. PCT/US2024/048055, Dec. 20, 2024, 17 pages.

(Continued)

*Primary Examiner* — Volvick Derose
(74) *Attorney, Agent, or Firm* — Weaver IP L.L.C.

(57) ABSTRACT

Systems, methods, apparatuses, and computer program products are disclosed for employing a hybrid boot to reimage a target device using a mobile device. A mobile device provides, to a target device, a boot file configured to execute an intermediate operating system. The mobile device performs a user presence check to determine whether the target device is in proximity to the mobile device. Responsive to determining that the target device is in proximity to the mobile device, the mobile device provides, to the intermediate operating system on the target device, transfer information associated with at least a first restricted-access portion of a customized system image to cause the intermediate operating system to obtain the first restricted-access portion of the customized system image and reimage the target device based at least on the first restricted-access portion of the customized system image.

20 Claims, 8 Drawing Sheets

(56) References Cited

U.S. PATENT DOCUMENTS

| | | | | |
|---|---|---|---|---|
| 2002/0161995 | A1* | 10/2002 | French | G06F 9/4416 |
| | | | | 713/2 |
| 2003/0009657 | A1* | 1/2003 | French | H04L 41/0213 |
| | | | | 713/2 |
| 2008/0046708 | A1* | 2/2008 | Fitzgerald | G06F 8/64 |
| | | | | 713/2 |
| 2008/0195769 | A1* | 8/2008 | Anwer | H04L 67/34 |
| | | | | 710/17 |
| 2010/0082969 | A1* | 4/2010 | Barron, Jr. | G06F 9/4416 |
| | | | | 709/222 |
| 2011/0246755 | A1* | 10/2011 | Patnaik | G06F 9/4416 |
| | | | | 713/2 |
| 2012/0030456 | A1* | 2/2012 | Wu | G06F 9/5077 |
| | | | | 713/2 |
| 2013/0167159 | A1* | 6/2013 | Ricci | H04W 84/005 |
| | | | | 719/319 |
| 2019/0196761 | A1* | 6/2019 | Minakawa | G06F 3/1238 |
| 2019/0384916 | A1* | 12/2019 | Shah | G06F 21/575 |
| 2020/0112435 | A1* | 4/2020 | Mueller | G06F 21/72 |
| 2020/0184078 | A1* | 6/2020 | Hinrichs | H04L 9/3268 |
| 2025/0021416 | A1* | 1/2025 | Norton, Jr. | G06F 11/008 |
| 2025/0060970 | A1* | 2/2025 | Rathinasamy | G06F 9/4401 |

OTHER PUBLICATIONS

"Welcome To App Center", Retrieved From: https://appcenter.ms/, Retrieved From: Aug. 14, 2023, 9 Pages.

* cited by examiner

HYBRID BOOT FOR SYSTEM REIMAGING

BACKGROUND

Remote bootstrapping involves the process of initializing and configuring a computer system without physically being present at the location of the machine. Administrators may remotely initiate the startup of the device, configuring essential settings, installing the operating system, and deploying necessary software applications and updates. Remote bootstrapping streamlines system deployment, reduces deployment time, and minimizes the need for on-site intervention, making it a useful tool for modern IT (information technology) infrastructure management and support in remote or geographically dispersed environments.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, apparatuses, and computer program products are disclosed for employing a hybrid boot to reimage a target device using a mobile device. A mobile device provides, to a target device, a boot file configured to execute an intermediate operating system. The mobile device performs a user presence check to determine whether the target device is in proximity to the mobile device. Responsive to determining that the target device is in proximity to the mobile device, the mobile device provides, to the intermediate operating system on the target device, transfer information associated with at least a first restricted-access portion of a customized system image to cause the intermediate operating system to obtain the first restricted-access portion of the customized system image and reimage the target device based at least on the first restricted-access portion of the customized system image.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
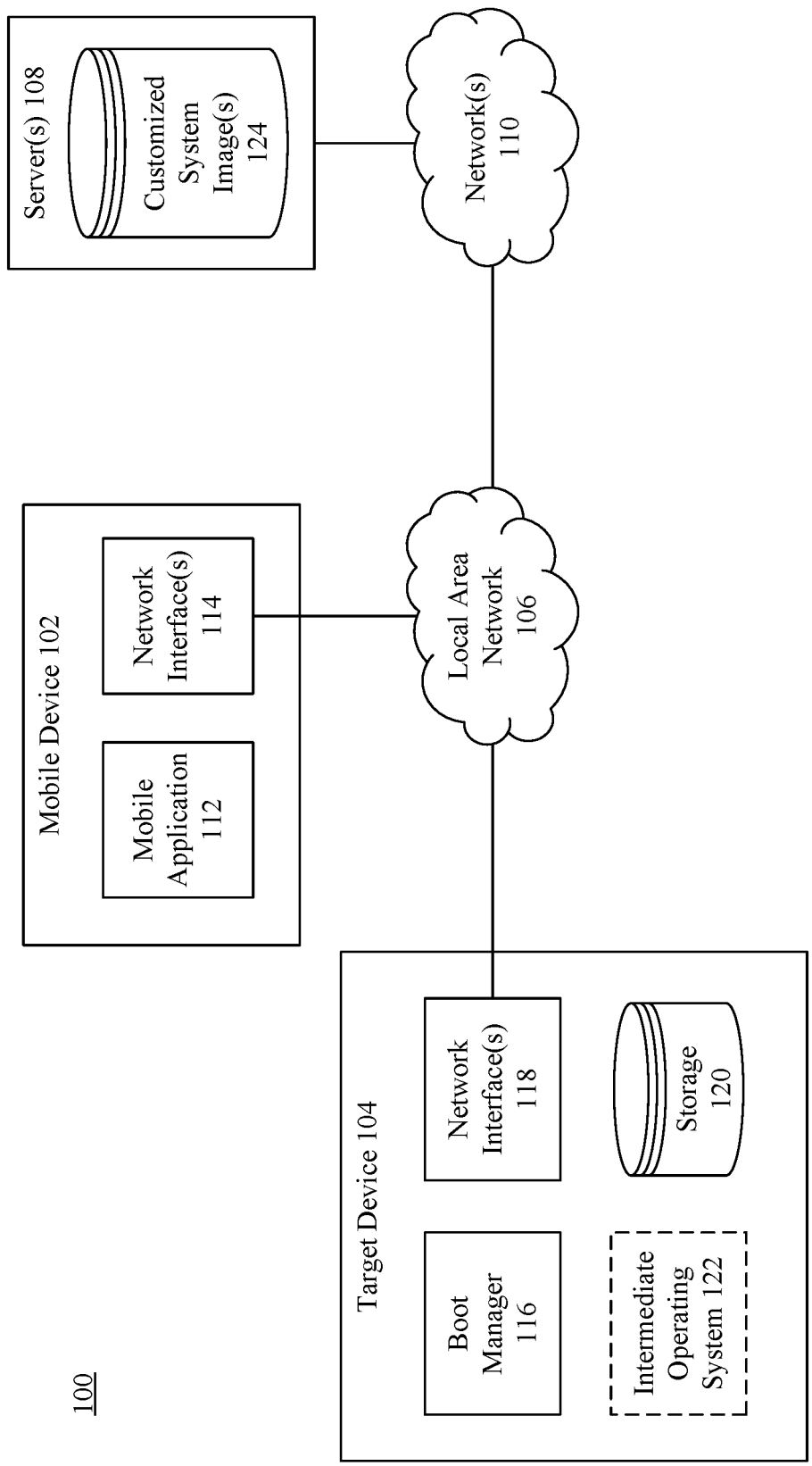
FIG. 1 shows a block diagram of an example hybrid boot system for reimaging a target device using a mobile device, in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Teleworking, also known as remote work or telecommuting, refers to a work arrangement where employees complete their tasks and responsibilities from a location outside of the traditional office environment, often from their homes. Enabled by digital technologies and the Internet, teleworking allows employees to connect to their workplace systems, collaborate with colleagues, and/or complete work-related assignments using computers, smartphones, and other digital devices. Telework provides employees with the freedom to manage their schedules, achieve a better work-life balance, and/or avoid the need for a daily commute. It also offers companies the opportunity to tap into a broader talent pool, reduce office space costs, and/or potentially increase productivity by leveraging remote collaboration tools and communication platforms.

IT (information technology) teams may occasionally encounter the need to remotely bootstrap a teleworking machine (e.g., a computing device such as a desktop computer, a laptop computer, a tablet computer, a smart phone, etc.) in order to reimage the teleworking machine, where "reimage" refers to replacing the installed version of the operating system of the machine with a known working version of the operating system. Such reimaging may further include replacing installed versions of applications and/or data on the machine with replacement versions. In one example, an IT team may desire to restore a teleworker's malfunctioning machine to a working state and/or provide a customized system image to a newly hired teleworker's machine. However, the remote nature of teleworking presents various challenges to remote bootstrapping. For instance, the remote bootstrapping process relies on a stable network connection, and any interruptions can lead to installation delays and/or failures. Furthermore, ensuring security during the bootstrapping phase is important, as sensitive data and/or credentials may be transmitted. Additionally, troubleshooting and providing real-time support during the remote bootstrapping process can be challenging, especially when dealing with non-technical end-users.

Embodiments disclosed herein include a hybrid boot platform to allow new hires and existing teleworkers to bootstrap their work environment (e.g., at home or other remote location), and to provide a customized version of the work environment based on teleworkers' teams and/or projects. Bootstrapping involves loading an operating system and/or other essential software components into a computer's memory so that the computer can be used. Enabling remote bootstrapping of telework machines provide many benefits, including, but not limited to, reducing new hire onboarding time by automating system setup and configuration of the new hire's telework machine, improving teleworker satisfaction by reducing the need to travel to the office for IT support, reduce security risk by updating teleworkers' work environments through frequent re-bootstrapping, reduce downtime required to reconfigure a teleworker's work environment for a new project, role, or task, and/or isolate teleworkers' work environment by bootstrapping temporary task-specific virtual machines.

In embodiments, the hybrid boot platform performs remote bootstrapping of a teleworker's target device using a mobile application running on the teleworker's mobile device. The mobile application accesses a boot file configured to execute an intermediate operating system (OS). In embodiments, the mobile application may provide the boot file to the target device through various means, including, but not limited to, over a network (e.g., local area network (LAN), personal area network (PAN), etc.), and/or using a removable storage device (e.g., USB drive, memory card, etc.) that is connectable to the target device.

In embodiments, the mobile application causes the mobile device to host one or more servers to serve the boot file over a network. For instance, the mobile application may, in embodiments, host a preboot execution environment (PXE) server on the mobile device to allow the target device to boot over the network. In embodiments, the PXE server may include a boot service to provide an identifier of the boot file, and/or a file transfer (e.g., trivial file transfer protocol (TFTP), etc.) server that will provide the boot file to the target device. Additionally, the mobile application may host, as part of the PXE server or as a standalone server, a dynamic host configuration protocol (DHCP) server or DHCP proxy server to assign an internet protocol (IP) address to the target device, and to provide the IP address of a file transfer server. In embodiments, when the target device is booted over a network, the target device executes a PXE client. The PXE client on the target device requests an IP address from the DHCP server for its network interface and/or the IP address of the file transfer server. The PXE client may then contact the file transfer server to obtain the boot file. Due to limitations associated with PXE, the DHCP server and TFTP server running on the mobile device may, in embodiments, need to reside on the same network segment as the target device. However, the use of IP helpers to forward traffic across network may, in embodiments, allow the target device to be located on a different network segment than the DHCP server and/or TFTP server.

In embodiments, the mobile application may provide the boot file to the target device by transferring the boot file to a removable storage device that is connectable to the target device. For instance, the mobile application may instruct the user to connect a removable storage device to a port of the mobile device. The mobile application may then transfer the boot file to the connected removable storage device. In embodiments, the mobile application may instruct the user to remove the connected removable storage device from the port of the mobile device, and to connect the removable storage device to a port of the target device. In embodiments, the mobile application may further instruct the user to boot the target device using the removable storage device. For instance, the mobile application may instruct the user to press one or more keys on the target device to access a boot menu and to select a boot option to boot from the removable storage device.

Using the boot file, the target device boots into the intermediate OS. In embodiments, the intermediate OS executing on the target device may interact with the mobile application to perform a user presence check to verify that the target device is in proximity to the mobile device. The user presence check may serve several purposes. For example, the user presence check ensures that the mobile device and the target device are both in proximity to the user. Furthermore, the user presence check prevents another device from interacting with the mobile application without the user's knowledge, and prevents the user from accidentally connecting the target device to an unknown boot server on the same network. Additionally, the user presence check, may in embodiments, allow the mobile application and the intermediate OS to exchange key derivation data that can be used to establish a secure communication channel between the mobile device and the target device. The secure communication channel may be used to exchange sensitive information, such as, but not limited to, access tokens, authentication information, and/or portions of the customized system images.

In embodiments, the intermediate OS executing on the target device may obtain a customized system image, and reimage the target device using the customized system image. For instance, the intermediate OS may interact with the mobile application to obtain at least a restricted-access portion of the customized system image. In embodiments, the intermediate OS may obtain the restricted-access portion of the customized system image directly from the mobile application. Alternatively, the intermediate OS may obtain transfer information from the mobile device, and obtain the restricted-access portion of the customized system image from another location over a network (e.g., LAN, PAN, wide area network (WAN), Internet, etc.). In embodiments, the transfer information may include, but is not limited to, location information (e.g., network address), a file identifier (e.g., filename, memory location, etc.), and/or security information (e.g., an access token, delegated access token, authentication information, etc.) to enable secured access to the restricted-access portion of the customized system image. Additionally, the intermediate OS may, in embodiments, obtain a publicly accessible portion of the customized system image from a second source. In embodiments, the publicly accessible portion of the customized system image may include a base image.

In embodiments, the intermediate OS may reimage the target device based on one or more of the restricted-access portion of the customized system image and/or the publicly accessible portion of the customized system image. For instance, the intermediate OS may, in embodiments, reimage the target device in one or more phases or steps, using one or more of the restricted-access portion of the customized system image and/or the publicly accessible portion of the customized system image during each phase or step in the reimaging process.

These and further embodiments are disclosed herein that enable the functionality described above and further such functionality. Such embodiments are described in further detail as follows.

For instance, FIG. 1 shows a block diagram of an example system 100 for reimaging a target device using a mobile device, in accordance with an example embodiment. As shown in FIG. 1, system 100 includes a mobile device 102, a target device 104, and one or more servers 108. Mobile device 102 and target device 104 are communicatively coupled to each other via a local area network (LAN) 106. Server(s) 108 are communicatively coupled to mobile device 102, target device 104, and LAN 106 via one or more networks 110 (e.g., a wide area network, such as the Internet). In embodiments, LAN 106 and/or network(s) 110 may include one or more wired and/or wireless portions. Additionally, system 100 may, in embodiments, be implemented using other types of network, such as, but not limited to, personal area networks (PANs), metro area networks (MANs), corporate networks, cellular networks, wireless networks, and the like. Furthermore, in embodiments, LAN 106, and network(s) 110 may be implemented as a single network. System 100 is described in further detail as follows.

Mobile device 102 may include, but is not limited to, a handheld computer (e.g., a personal digital assistant (PDA)), a tablet computer (such as an Apple iPad™), a mobile phone (e.g., a cell phone, a smart phone such as an Apple® iPhone® by Apple Inc., a phone implementing the Google® Android™ operating system, etc.), and the like. Various example implementations of mobile device 102 are described below in reference to FIG. 9 (e.g., Computing Device 902). As shown in FIG. 1, mobile device 102 includes a mobile application 112 and one or more network interfaces 114.

Target device 104 may include, but is not limited to, a laptop computer, a tablet computer (such as a Microsoft Surface™), a hybrid device, a notebook computer, a netbook, a desktop computer, a personal computer (PC), and the like. Various example implementations of target device 104 are described below in reference to FIG. 9 (e.g., Computing Device 902). As shown in FIG. 1, target device 104 includes a boot manager 116, one or more network interfaces 118, a storage 120, and an intermediate operating system (OS) 122. In embodiments, target device 104 is not pre-loaded with intermediate OS 122, and receives intermediate OS 122 as part of a boot file that is configured to execute intermediate OS 122.

Server(s) 108 may include, but are not limited to, one or more servers for hosting one or more customized system images 124. In embodiments, server(s) 108 may be implemented separately and externally from mobile device 102 and target device 104. Additionally, server(s) 108 may, in embodiments, be communicatively coupled to mobile device 102 and/or target device 104 via a network (e.g., LAN, WAN, PAN, wireless, wired, optical, cellular, etc.) that is separate and distinct from LAN 106 and/or network(s) 110. Furthermore, server(s) 108 may, in embodiments, be implemented, at least partially, on mobile device 102. Various example implementations of server(s) 108 are described below in reference to FIG. 9 (e.g., Network-Based Server Infrastructure 970, On-Premises Servers 992, and/or components thereof).

Mobile application 112 is configured to bootstrap target device 104 by providing target device 104 a boot file configured to execute intermediate OS 122. Mobile application 112 may further be configured to interact with intermediate OS 122 to enable intermediate OS 122 to obtain a customized system image 124 and reimage target device 104 with customized system image 124. In embodiments, mobile application may also be configured to authenticate a user to ensure that the user has been granted access to the customized system image 124, and/or to determine which customized system image 124 should be provided to target device 104. Mobile application 112 may, in embodiments, be obtained from a publicly accessible source, such as, but not limited to, a digital marketplace or platform (e.g., app store). Alternatively, mobile application 112 may be obtained directly from, for example, but not limited to, an employer, an IT department, a service provider, and/or the like. For example, mobile device 102 may download and install mobile application 112 upon accessing a hyperlink and/or scanning a QR code provided by an employer, an IT department, and/or a service provider. Mobile application 112 will be described in greater detail in conjunction with FIG. 2 below.

Boot manager 116 is configured to load and initiate an operating system on target device 104. When target device 104 is powered on, boot manager 116 resides in the firmware or the Master Boot Record (MBR) of target device 104, and is configured to present one or more boot options to the user. Boot manager 116 loads an operating system from the selected boot option into memory of target device 104 memory and hands over control to a bootloader of the operating system. For instance, boot manager 116 may, in embodiments, load intermediate OS 122 into the memory of target device 104. Boot manager 116 is described in greater detail in conjunction with FIG. 2 below.

Network interface(s) 114 and/or 118 may include, but are not limited to, a wireless modem (e.g., Wi-Fi, Bluetooth, NFC, Cellular, LTE, 5G, etc.), a wired interface (e.g., Ethernet, etc.), and the like. Network interface(s) 114 and/or 118 respectively enable mobile device 102 and target device 104 to connect to LAN 106 and/or network(s) 110. Various example implementations of network interface(s) 114 and/or 118 are described below in reference to FIG. 9 (e.g., Wireless Modem(s) 960, Wired Interface(s) 980, and/or components thereof).

Storage 120 may include one or more memory devices for storing applications on target device 104. Various example implementations of storage 120 are described below in reference to FIG. 9 (e.g., Storage 920, and/or components thereof).

Intermediate OS 122 may include, but is not limited to, a recovery OS, a rescue OS, a specialized OS, and/or a lightweight OS that is designed to diagnose, troubleshoot, and repair problems on target device 104. In embodiments, intermediate OS 122 may include, but is not limited to, Windows Preinstallation Environment (WinPE), and/or Windows Recovery Environment (WinRE) by Microsoft Corporation. Intermediate OS 122 may reimage target device 104 by deploying a customized system image 124 onto target device 104. In embodiments, customized system image(s) 124 may include a customized image of an operating system, such as, but not limited to, Microsoft Windows, Linux, MacOS, and/or the like. During reimaging, target device 104 may boot into intermediate OS 122 from a removable storage device (e.g., USB, memory card, etc.), CD/DVD, and/or network source. The reimaging process replaces the existing operating system, applications, and/or settings on target device 104 with a customized configuration.

Customized system image(s) 124 may include, but are not limited to, one or more base or generic system images based on a role, team, project, and/or function (developer, PM, etc.) associated with a user, one or more system images optimized for specific roles by including applications (e.g., Visual Studio) associated with the role, and/or one or more system images customized for specific teams and/or projects. In embodiments, after a target machine boots up with a base image, deep customization may be employed to expand the base system image with additions, such as, but not limited to, security groups, distribution lists, developer specific tools (e.g., Far, Kusto explorer, Forking diff viewer, XTS, etc.), GIT repositories, OS features, OS configuration updates, and the like.

Figure 2:
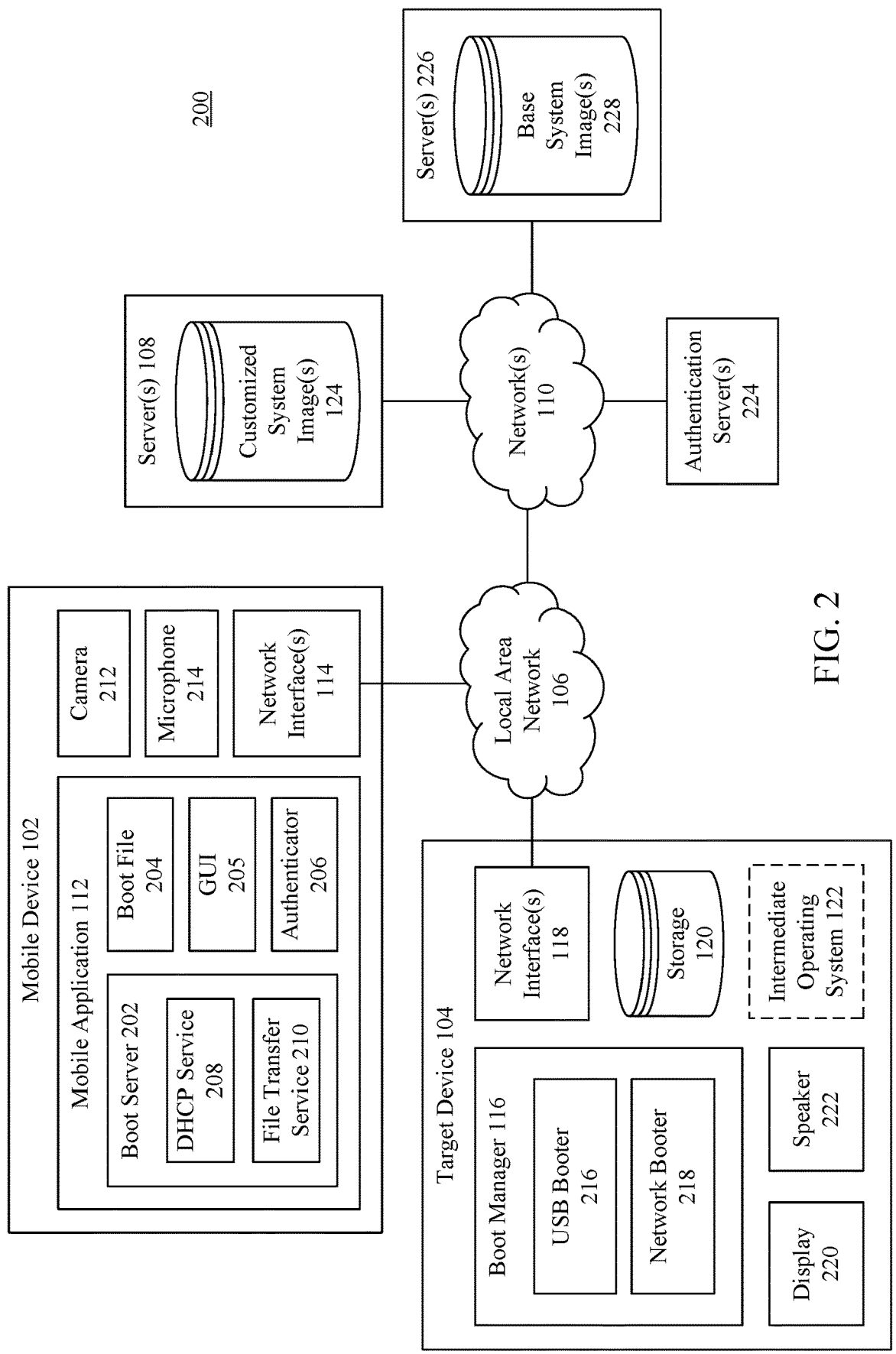
FIG. 2 shows a block diagram of an example hybrid boot system for reimaging a target device using a mobile device, in accordance with an embodiment.

Embodiments described herein may operate in various ways to reimage a target device using a mobile device. For instance, FIG. 2 shows a block diagram of an example system 200 for reimaging a target device using a mobile device, in accordance with an embodiment. As shown in FIG. 2, system 200 includes mobile device 102, target device 104. LAN 106, server(s) 108, network(s) 110, mobile application 112, network interface(s) 114, boot manager 116, network interface(s) 118, storage 120, intermediate OS 122, and customized system image(s) 124, as shown in FIG. 1. System 200 further includes one or more authentication servers 224 and one or more servers 226 that are each communicatively coupled to mobile device 102, target device 104, LAN 106, and server(s) 108 via network(s) 110. In system 200, mobile application 112 further includes a boot server 202, a boot file 204, a graphical user interface (GUI) 205, and an authenticator 206. Furthermore, boot server 202 includes a DHCP service 207, a boot service 208, and a TFTP service 210. Additionally, mobile device 102 further includes a camera 212 and a microphone 214. Moreover, boot manager 116 further includes a USB booter 216 and a network booter 218. Still further, target device 104 includes a display 220 and a speaker 222. System 200 is described in further detail as follows.

Boot server 202 is configured to host one or more services on LAN 106, such as, but not limited to, DHCP service 208, and/or file transfer service 210. In embodiments, boot server may be implemented as a PXE server to provide boot file 204 to target device 104 over LAN 106. For instance, when target device 104 is booted over a network using PXE, DHCP service 208 may receive from target device 104 a DHCP request including a PXE boot request. DHCP service 207 may, in embodiments, respond by assigning an IP address to target device 104 and providing information necessary to PXE boot, including, but not limited to, an identifier (e.g., IP address, hostname, etc.) associated with file transfer service 210, and/or an identifier (e.g., filename) of boot file 204. Subsequently, file transfer 210 may receive a file transfer request from target device 104 for boot file 204, and may respond by transferring boot file 204 to target device 104 over LAN 106. In embodiments, file transfer service 210 may implement one or more file transfer protocols, such as, but not limited to, TFTP, file transfer protocol (FTP), secure file transfer protocol (SFTP), hypertext transfer protocol (HTTP), and/or any other file transfer protocol.

Boot file 204 may include information and/or instructions needed to execute intermediate OS 122 on target device 104. In embodiments, boot file 204 may cause target device 104 to request additional files from file transfer service 210 in order to execute intermediate OS 122.

GUI 205 may be configured to provide one or more user interface elements (e.g., user interface controls) to aid the user in reimaging target device 104 using the hybrid boot platform. In embodiments, the one or more user interface elements may include, but are not limited to, informational elements to guide the user through remote bootstrapping of target device 104, navigational elements to allow the user to navigate through the various steps in the hybrid boot process, input elements to allow a user to input information (e.g., authentication information, etc.) into mobile application 112, and/or option selection elements to allow the user to select from one or more options (e.g., selecting from one of a plurality of customized system image(s) 124 that may be available to the user based on their role, team, function, and/or project).

Authenticator 206 is configured to authenticate a user (e.g., teleworker) with authentication server(s) 224. In embodiments, authentication may serve various purposes, such as, but not limited to, ensuring that the user is authorized to access customized system image(s) 124, determining which customized system image(s) 124 are available to the user based on attributes (e.g., role, permissions, group, department, etc.) associated with the user, and/or determining configurations and/or settings for the user based on attributes (e.g., role, permissions, group, department, etc.) associated with the user. Authenticator 206 may authenticate the user based on various information, such as, but not limited to, a user identifier (e.g., username, employee id, alias, name, SSN, etc.), a user password, user biometric information (e.g., fingerprint, retina scan, face scan, palm scan, voice authentication, etc.), second-factor authentication (e.g., code generator, physical token, etc.), authentication token, digital certificate, location information, and/or any combination thereof.

Camera 212 is configured to capture visual data to facilitate reimaging of target device 104, such as, but not limited to, information (e.g., text, QR code, barcode, etc.) displayed on and/or by target device 104. Various example implementations of camera 212 are described below in reference to FIG. 9 (e.g., Camera 936).

Microphone 214 is configured to capture sound data to facilitate reimaging of target device 104, such as, but not limited to, audible and/or inaudible sounds produced by target device 104. Various example implementations of microphone 214 are described below in reference to FIG. 9 (e.g., Camera 934).

USB booter 216 is configured to boot target device 104 using a removable storage device connected to target device 104. For instance, USB booter 216 may, in embodiments, boot target device 104 into intermediate OS 122 using boot file 104 that is provided by mobile device 102 via a removable storage device.

Network booter 218 is configured to boot target device 104 over a network. For instance, network booter 218 may, in embodiments, boot target device 104 into intermediate OS 122 using boot file 104 that is provided by mobile device 102 over LAN 106. In embodiments, network booter 218 may boot target device 104 using PXE boot by communicating with boot server 202 and/or components thereof.

Display 220 is configured to output visual data to facilitate reimaging of target device 104, such as, but not limited to, information (e.g., text, QR code, barcode, etc.) that may be used to perform a user presence check and/or to establish a secure communication channel with mobile device 102. Various example implementations of display 220 are described below in reference to FIG. 9 (e.g., Display 954).

Speaker 222 is configured to output sound data to facilitate reimaging of target device 104, such as, but not limited to, audible and/or inaudible sounds encoded with information that may be used to perform a user presence check and/or to establish a secure communication channel with mobile device 102. Various example implementations of speaker 222 are described below in reference to FIG. 9 (e.g., Speaker 952).

Authentication server(s) 224 may be configured authenticate a user of mobile device 102. For instance, authentication server(s) 224 may receive a user authentication request from authenticator 206, and verify the identity of the user by comparing information provided in the authentication request against stored records in a secure database. Upon successful authentication, authentication server(s) 224 may provide mobile device 102 and/or target device 104 information necessary for reimaging target device 104, such as, but not limited to, attributes (e.g., role, permissions, department, group, etc.) associated with the authenticated user, identifiers of customized system image(s) associated with the authenticated user, identifiers of base system image(s) associated with the authenticated user, security information (e.g., delegated token, authentication token, digital certificate, decryption key, key derivation data, etc.) to enable mobile device 102 and/or target device 104 to access restricted-access portions of customized system image(s) 124. In embodiments, authentication server(s) 224 may also provide, as part of the security information or separately, location information (e.g., server address, cloud location, etc.) associated with the access restricted-access portions of customized system image(s) 124.

Server(s) 226 is configured to host base system image(s) 228. In embodiments, server(s) 226 may be publicly accessible over network(s) 110. In embodiments, server(s) 226 may be implemented separately and externally from mobile device 102, target device 104, and/or server(s) 108. Additionally, server(s) 226 may, in embodiments, be communicatively coupled to mobile device 102 and/or target device 104 via a network (e.g., LAN, WAN, PAN, wireless, wired, optical, cellular, etc.) that is separate and distinct from LAN 106 and/or network(s) 110. Furthermore, server(s) 226 may, in embodiments, be implemented, at least partially, on mobile device 102. In embodiments, server(s) 226 and server(s) 108 may be co-located on one or more physical machines. Various example implementations of server(s) 226 are described below in reference to FIG. 9 (e.g., Network-Based Server Infrastructure 970, On-Premises Servers 992, and/or components thereof).

Base system image(s) 228 may include base operating system images that are common to one or more customized system image(s). Compared to customized system image(s) 124, based system image(s) 228 are less likely to contain sensitive information (e.g., proprietary information associated with an employer). In embodiments, base system image(s) 228 may be publicly available over network(s) 110 (e.g., Internet).

Figure 3:
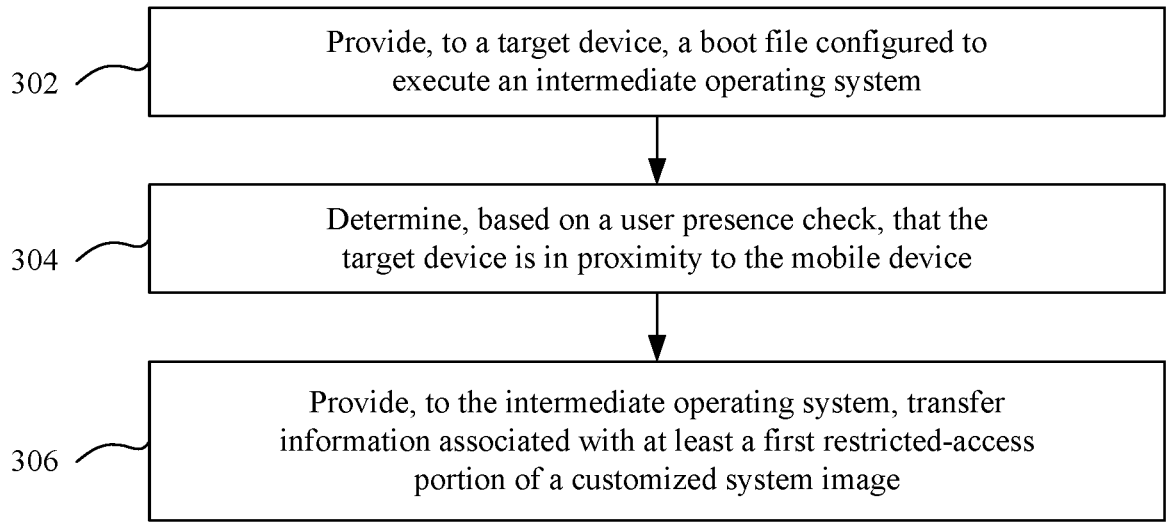
FIG. 3 depicts a flowchart of a process for reimaging a target device using a mobile device, in accordance with an embodiment.

Embodiments described herein may operate in various ways to reimage a target device using a mobile device. For instance, FIG. 3 depicts a flowchart 300 of a process for reimaging a target device using a mobile device, in accordance with an embodiment. Mobile device 102, mobile application 112, network interface(s) 114, boot server 202, boot file 204, authenticator 206, DHCP service 208, file transfer service 210, camera 212, and/or microphone 214 of FIGS. 1 and/or 2 may operate according to flowchart 300, for example. Note that not all steps of flowchart 300 may need to be performed in all embodiments, and in some embodiments, the steps of flowchart 300 may be performed in different orders than shown. Flowchart 300 is described as follows with respect to FIGS. 1 and 2 for illustrative purposes.

Flowchart 300 starts at step 302. In step 302, a boot file configured to execute an intermediate operating system is provided to a target device. For example, mobile application 112 may provide boot file 204 to target device 104 to execute intermediate OS 122. In embodiments, mobile application 112 may provide boot file 204 over LAN 106 using boot server 202 and/or components thereof. Alternatively, mobile application 112 may, in embodiments, provide boot file 204 by transferring boot file 204 to a removable storage device connectable to target device 104.

In step 304, the target device is determined, based on a user presence check, to be in proximity to the mobile device. For example, mobile application 112 may determine, based on a user presence check, that target device 104 is in proximity to mobile device 102. In embodiments, the user presence check may be performed based on information provided by target device 104, such as, but not limited to, an image (e.g., QR code, barcode, etc.) displayed by target device 104, key derivation data provided by target device 104, information provided over a PAN by target device 104, sound information outputted by target device 104, textual information (e.g., code, etc.) displayed by target device 104. User presence checks are discussed in further detail in conjunction with FIG. 7 below.

In step 306, transfer information associated with at least a first restricted-access portion of a customized system image is provided to the intermediate operating system. For example, mobile application 112 may provide, to intermediate OS 122, transfer information to enable intermediate OS 122 to access a restricted-access portion of a customized system image 124 from server(s) 108. In embodiments, the transfer information may include, but is not limited to, location information associated with the restricted-access portion, an identifier (e.g., filename) associated with the restricted-access portion, and/or security information (e.g., delegated token, authentication token, digital certificate, decryption key, key derivation data, etc.) to enable target device 104 to access the restricted-access portion.

Figure 4:
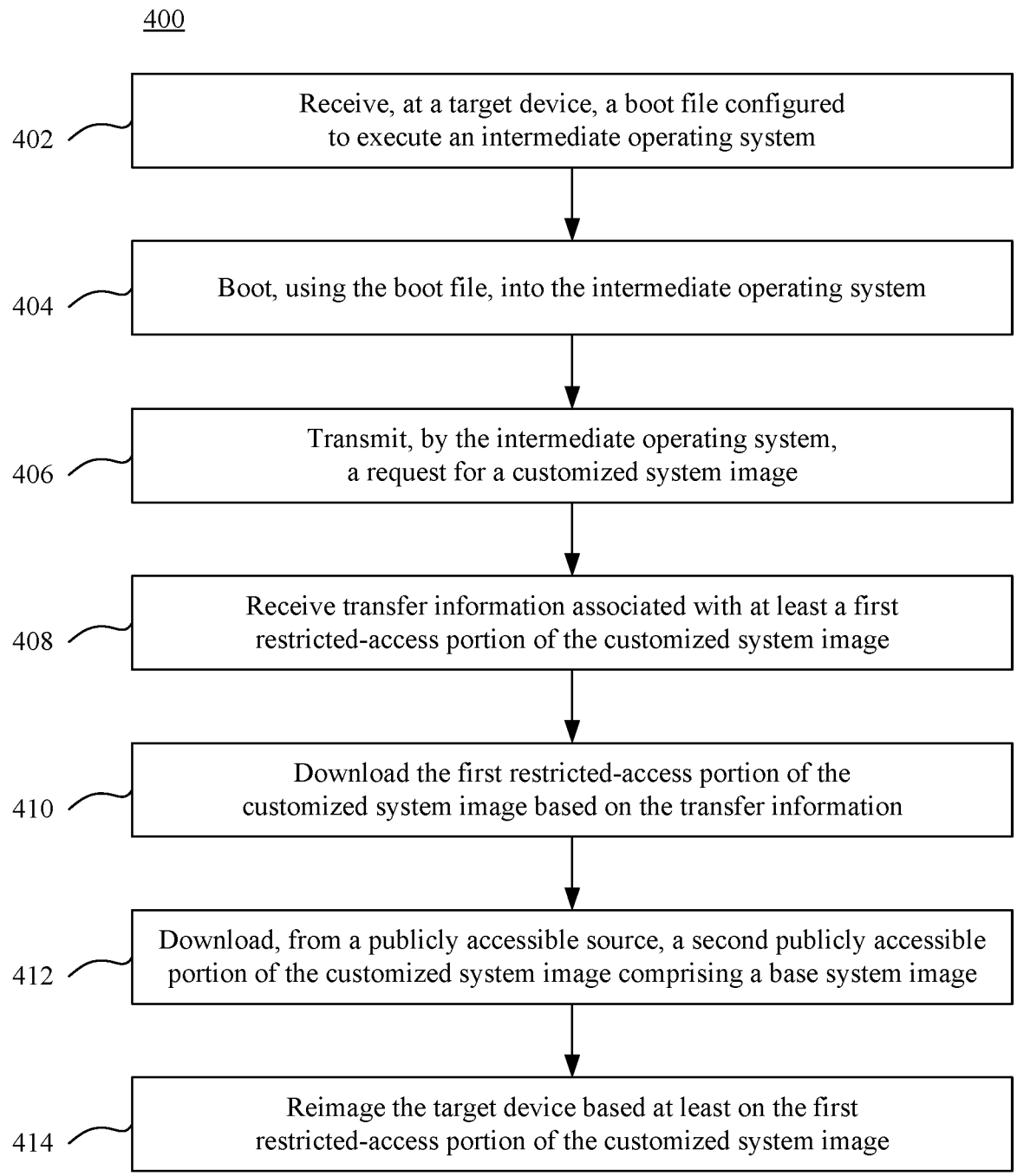
FIG. 4 depicts a flowchart of a process for reimaging a target device using a mobile device, in accordance with an embodiment.

Embodiments described herein may operate in various ways to reimage a target device using a mobile device. FIG. 4 depicts a flowchart 400 of a process for reimaging a target device using a mobile device, in accordance with an embodiment. Target device 104, boot manager 116, network interface(s) 118, storage 120, intermediate OS 122, USB booter 216, network booter 218, display 220, and/or speaker 222 of FIGS. 1 and/or 2 may operate according to flowchart 400, for example. Note that not all steps of flowchart 400 may need to be performed in all embodiments, and in some embodiments, the steps of flowchart 400 may be performed in different orders than shown. Flowchart 400 is described as follows with respect to FIGS. 1 and 2 for illustrative purposes.

Flowchart 400 starts at step 402. In step 402, a boot file is received at a target device, the boot file configured to execute an intermediate operating system. For example, target device 104 may receive, from mobile device 102, boot file 204 configured to execute intermediate OS 122. In embodiments, target device 104 may receive boot file 204 over LAN 106 from boot server 202 and/or components thereof. Alternatively, target device 104 may, in embodiments, receive boot file 204 from mobile application 112 via a removable storage device connected to target device 104.

In step 404, the intermediate operating system is booted into using the boot file. For example, boot manager may boot into intermediate OS 122 using boot file 204. In embodiments, boot manager 116 may employ USB booter 216 to boot into intermediate OS 122 using a removable storage device storing boot file 204. In other embodiments, boot manager 116 may employ network booter 218 to boot into intermediate OS 122 over network 116 by requesting boot file 204 from boot server 202 and/or file transfer service 210.

In step 406, a request is transmitted, by the intermediate operating system, for a customized system image. For example, intermediate OS 122 may request, from mobile application 112, access to a customized system image 124. In embodiments, intermediate OS 122 may identify customized system image 124 based on information and/or instructions included in boot file 204.

In step 408, transfer information associated with at least the first restricted-access portion of the customized system image is received. For example, intermediate OS 122 may receive, from mobile application 112, transfer information associated with a first restricted-access portion of the customized system image 124. In embodiments, the transfer information may include, but is not limited to, location information associated with the first restricted-access portion, and/or security information (e.g., delegated token, authentication token, digital certificate, decryption key, key derivation data, etc.) to target device 104 to access the first restricted-access portion from server(s) 108.

In step 410, the first restricted-access portion of the customized system image is downloaded based on the transfer information. For example, intermediate OS 122 may download the first restricted-access portion of the customized system image 124 from server(s) 108 based on the transfer information.

In step 412, a second publicly accessible portion of the customized system image is downloaded from a publicly accessible source. For example, intermediate OS 122 may download a second publicly accessible portion of base system image 228 from server(s) 226.

In step 414, the target device is reimaged based at least on the first restricted-access portion of the customized system image. For example, intermediate OS 122 may reimage target device 104 based at least on the first restricted-access portion of the customized system image 124. In embodiments, intermediate OS 122 may reimage target device 104 based on the second publicly accessible portion of the customized system image 124. Furthermore, intermediate OS 122 may, in embodiments, store an operating system, applications, data (e.g., work-related data, proprietary data, etc.), configurations, settings, and/or preferences on storage 120 based on the customized system image 124.

Figure 5:
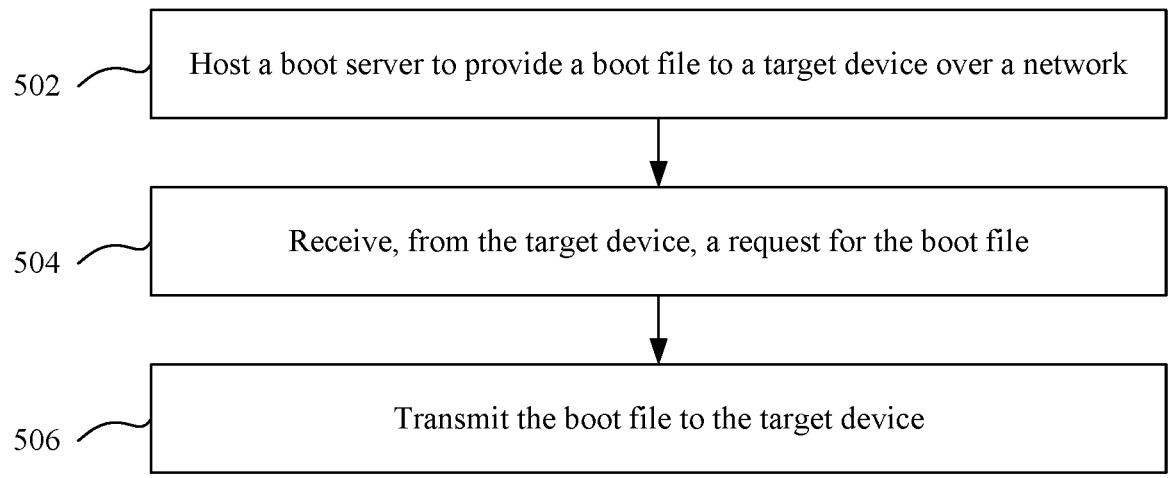
FIG. 5 depicts a flowchart of a process for hosting a boot server on a mobile device, in accordance with an embodiment.

Embodiments described herein may operate in various ways to host a boot file on a mobile device. FIG. 5 depicts a flowchart 500 of a process for hosting a boot server on a mobile device, in accordance with an embodiment. Mobile device 102, mobile application 112, network interface(s) 114, boot server 202, boot file 204, DHCP service 208, and/or file transfer service 210 of FIGS. 1 and/or 2 may operate according to flowchart 500, for example. Note that not all steps of flowchart 500 may need to be performed in all embodiments, and in some embodiments, the steps of flowchart 500v may be performed in different orders than shown. Flowchart 500 is described as follows with respect to FIGS. 1 and 2 for illustrative purposes.

Flowchart 500 starts at step 502. In step 502, a boot server is hosted to provide a boot file to a target device over a network. For example, mobile application 112 may host boot server 202 on mobile device 102 to provide boot file 204 to target device 104 over LAN 106. As discussed above, boot server 202 may, in embodiments, include a PXE server.

In step 504, a request is received, from the target device, for the boot file. For example, boot server 202 and/or file transfer service 210 may receive, from target device 104, a request for boot file 204.

In step 506, the boot file is transmitted to the target device. For example, file transfer service 210 may transmit boot file 204 to target device 104.

Figure 6:
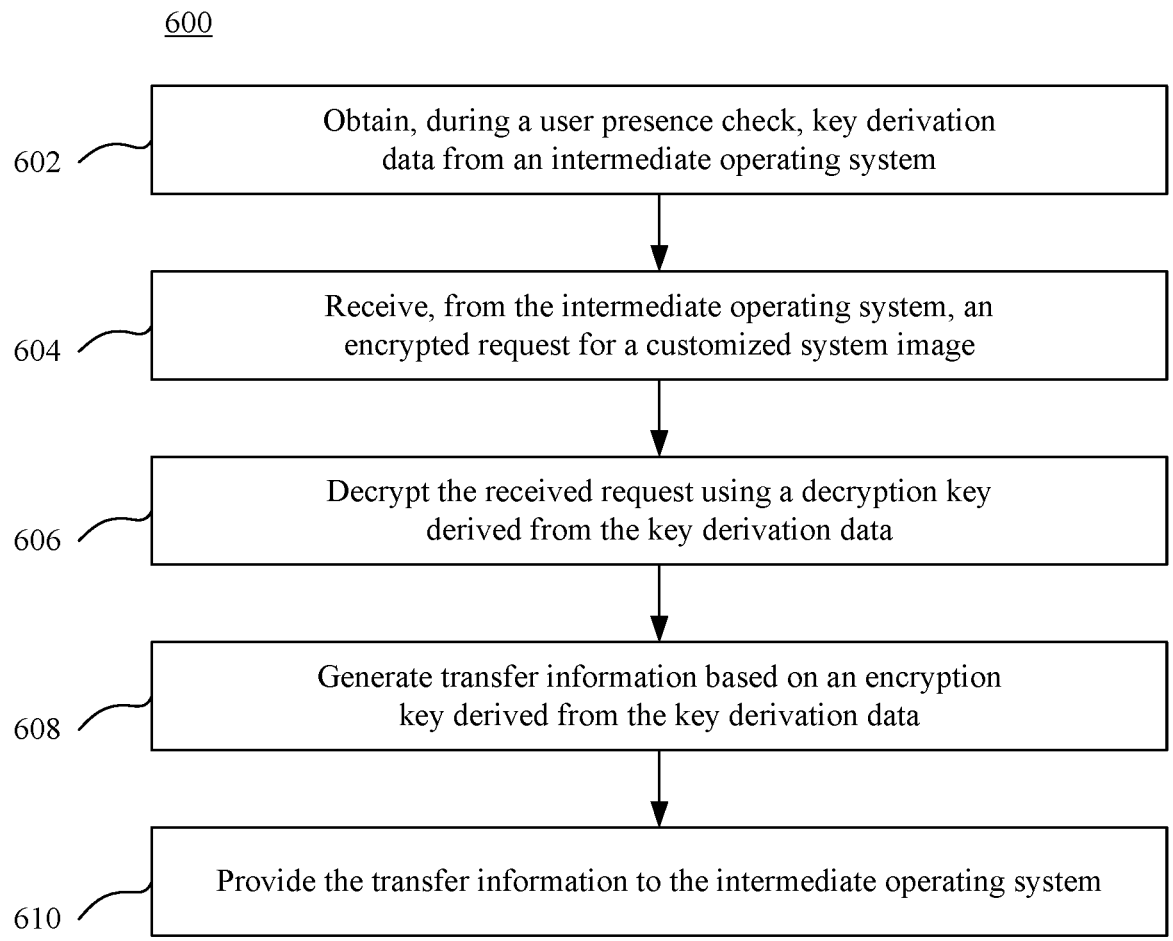
FIG. 6 depicts a flowchart of a process for providing access to at least a portion of a customized system image, in accordance with an embodiment.

Embodiments described herein may operate in various ways to provide access to at least a portion of a customized system image. FIG. 6 depicts a flowchart 600 of a process for providing delegated access to at least a portion of a customized system image, in accordance with an embodiment. Mobile device 102, mobile application 112, network interface(s) 114, boot server 202, boot file 204, authenticator 206, DHCP service 208, file transfer service 210, camera 212, and/or microphone 214 of FIGS. 1 and/or 2 may operate according to flowchart 600, for example. Note that not all steps of flowchart 600 may need to be performed in all embodiments, and in some embodiments, the steps of flowchart 600 may be performed in different orders than shown. Flowchart 600 is described as follows with respect to FIGS. 1 and 2 for illustrative purposes.

Flowchart 600 starts at step 602. In step 602, key derivation data is obtained from an intermediate operating system during a user presence check. For example, mobile application 112 may obtain key derivation data from intermediate OS 122 during a user presence check. In embodiments, key derivation data may include, but is not limited to, any information (e.g., seed data, random number, timestamp, etc.) that may be used to derive an encryption key, a decryption key, a symmetric key, public key, and/or a private key. In embodiments, key derivation data is equivalent to the key, where the key is derived by simply reading or parsing the key derivation data. User presence checks are discussed in further detail in conjunction with FIG. 7 below.

In step 604, an encrypted request for a customized system image is received from the intermediate operating system. For example, mobile application 112 may receive an encrypted request from intermediate OS 122 for a customized system image 124.

In step 606, the encrypted request is decrypted using a decryption key derived from the key derivation data. For example, mobile application 112 may decrypt the encrypted request using a decryption key derived from the key derivation data. In embodiments, mobile application 112 may process the decrypted request by performing one or more of: authenticating the user, determining whether the user is permitted to access the requested customized system image 124, and/or requesting, from authentication server(s) 224, delegated access to the requested customized system image 124.

In step 608, transfer information is generated based on an encryption key derived from the key derivation data. For example, mobile application 112 may generate transfer information based on an encryption key derived from the key derivation data. In embodiments, mobile application 112 may receive, from authentication server(s) 224, security information (e.g., delegated token, authentication token, digital certificate, decryption key, key derivation data, etc.) to enable delegated access to restricted-access portions of the requested customized system image 124, and may generate the transfer information by encrypting at least the security information using the encryption key. In embodiments, the transfer information may further include, but is not limited to, location information (e.g., server address, cloud location, etc.) associated with the restricted-access portion, and/or an identifier (e.g., filename) associated with the restricted-access portion. In embodiments, the encryption key derived from the key derivation data may be a symmetric key that is equivalent to the decryption key derived from the key derivation data.

In step 610, the transfer data is provided to the intermediate operating system. For example, mobile application 112 may provide the transfer information to intermediate OS 122.

Figure 7:
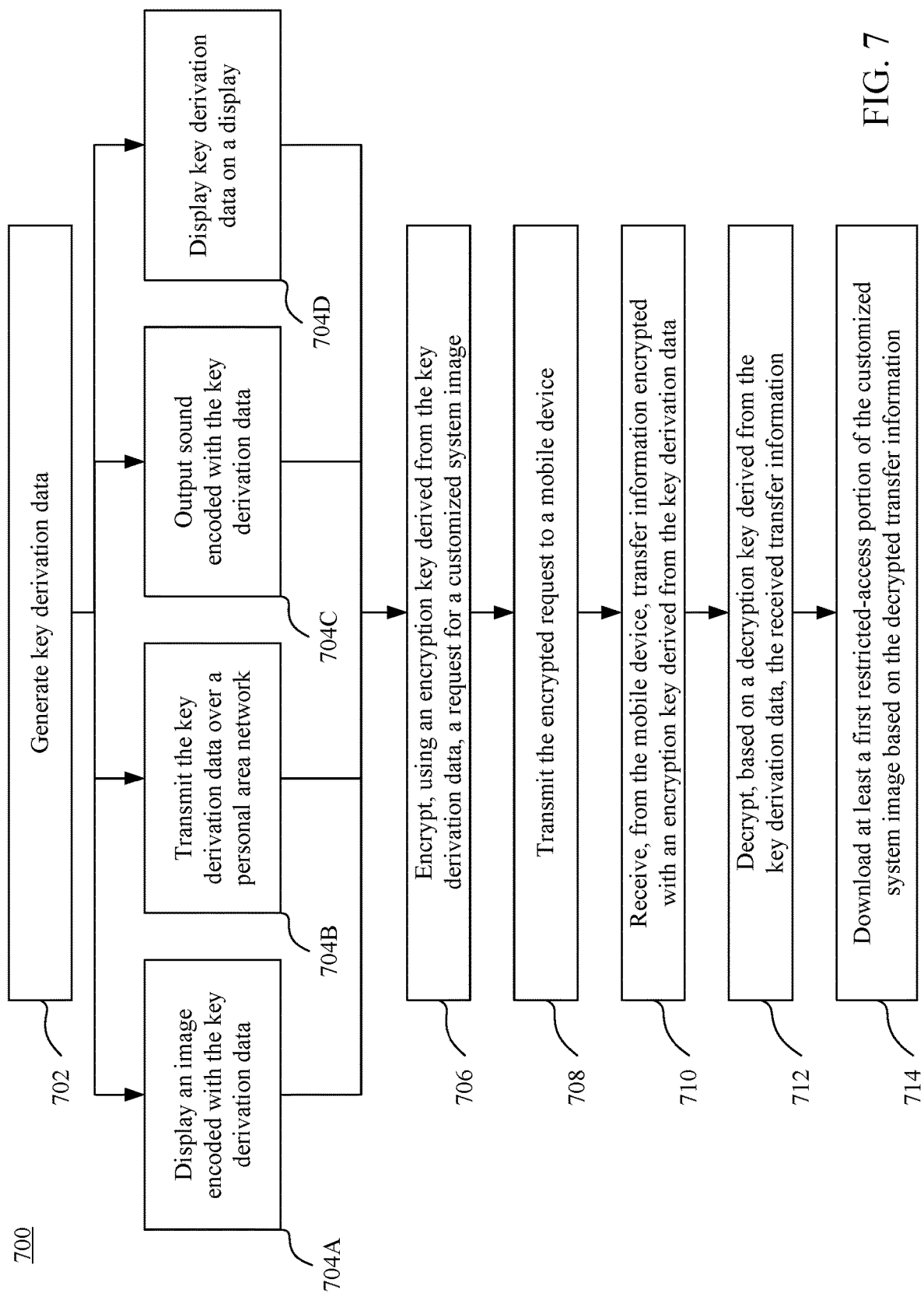
FIG. 7 depicts a flowchart of a process for performing a user presence check, in accordance with an embodiment.

Embodiments described herein may operate in various ways to perform a user presence check. FIG. 7 depicts a flowchart 700 of a process for performing a user presence check, in accordance with an embodiment. Target device 104, boot manager 116, network interface(s) 118, storage 120, intermediate OS 122, USB booter 216, network booter 218, display 220, and/or speaker 222 of FIGS. 1 and/or 2 may operate according to flowchart 700, for example. Note that not all steps of flowchart 700 may need to be performed in all embodiments, and in some embodiments, the steps of flowchart 700 may be performed in different orders than shown. Flowchart 700 is described as follows with respect to FIGS. 1 and 2 for illustrative purposes.

Flowchart 700 starts at step 702. In step 702, key derivation data is generated. For example, intermediate OS 122 may generate key derivation data. In embodiments, key derivation data may include, but is not limited to, any information (e.g., seed data, random number, timestamp, etc.) that may be used to derive an encryption key, a decryption key, a symmetric key, public key, and/or a private key. In embodiments, key derivation data is equivalent to the key, where the key is derived by simply reading or parsing the key derivation data.

After step 702, flowchart 700 proceeds to one or more of steps 704A, 704B, 704C, and/or 704D. In embodiments, one or more of steps 704A. 704B, 704C, and/or 704D may be performed simultaneously, in parallel with one another, sequentially, and/or in any other order relative to one another. In embodiments, one or more of steps 704A, 704B, 704C, and/or 704D may be omitted.

In step 704A, an image encoded with the key derivation data is displayed. For example, intermediate OS 122 may encode key derivation data in an image (e.g., barcode, QR code, etc.) that is displayed on display 220. In embodiments, mobile application 112 may receive the key derivation data by detecting the image using camera 212 and decoding the image to obtain the key derivation data.

In step 704B, the key derivation data is transmitted over a personal area network. For example, intermediate OS 122 may transmit (e.g., broadcast, multicast, unicast, etc.) the key derivation data over a wired, wireless, optical, and/or infrared PAN (e.g., Bluetooth, near-field communication (NFC), wireless USB, etc.). In embodiments, intermediate OS 122 transmits the key derivation data using a PAN having a limited range (e.g., 10 meters, line-of-sight, etc.)

In step 704C, sound encoded with the key derivation data is output. For example, intermediate OS 122 may encode the key derivation data into audible or inaudible sound and output the sound on speaker 222. In embodiments, mobile application 112 may receive the key derivation data by detecting the sound using microphone 214 and decoding the sound to obtain the key derivation data.

In step 704D, the key derivation data is displayed on a display. For example, intermediate OS 122 may display the key derivation data on display 220. In embodiments, intermediate OS 122 may display the key derivation data as a textual code on display 220. The displayed textual code may be provided to mobile application 112 via user input on mobile device 102, and/or text recognition using camera 212.

In step 706, a request for a customized system image is encrypted using an encryption key derived from the key derivation data. For example, intermediate OS 122 may generate a request for a customized system image 124 and encrypt the generated request using an encryption key derived from the key derivation data.

In step 708, the encrypted request is transmitted to a mobile device. For example, intermediate OS 122 may transmit the encrypted request to mobile device 102. In embodiments, the encrypted request is decryptable by mobile application 112 based on a decryption key derived from the key derivation data provided in one or more of steps 704A. 704B, 704C, and/or 704D. In embodiments, a user presence check is successfully completed by the mobile device when it successfully decrypts the encrypted request using the decryption key derived from the key derivation data.

In step 710, transfer information, encrypted using an encryption key derived from the key derivation data, is received from the mobile device. For example, intermediate OS 122 may receive, from mobile device 102, transfer information encrypted using an encryption key derived from the key derivation data.

In step 712, the received transfer information is decrypted using a decryption key derived from the key derivation data. For example, intermediate OS 122 may decrypt the received transfer information using a decryption key derived from the key derivation data. In embodiments, the decryption key derived from the key derivation data may be a symmetric key that is equivalent to the encryption key derived from the key derivation data. In embodiments, a user presence check is successfully completed by intermediate OS 122 when it successfully decrypts the transfer information using the decryption key derived from the key derivation data. Upon decrypting the transfer information, intermediate OS 122 may, in embodiments, obtain security information (e.g., delegated token, authentication token, digital certificate, decryption key, key derivation data, etc.) that enables delegated access to restricted-access portions of the requested customized system image 124. In embodiments, intermediate OS 122 may, upon decrypting the transfer information, also obtain other information, such as, but not limited to, location information (e.g., server identifier, cloud location, etc.) associated with the restricted-access portion, and/or an identifier (e.g., filename) associated with the restricted-access portion, In step 714, at least a first restricted-access portion of the customized system image is downloaded based on the decrypted transfer information. For example, intermediate OS 122 may download at least a first restricted-access portion of the customized system image 124 based on the decrypted transfer information. In embodiments, intermediate OS 122 may generate a request for at least a first restricted-access portion of the customized system image 124 and transmit the generated request to server(s) 108 to download at least a first restricted-access portion of the customized system image 124. In embodiments, the request may include security information (e.g., delegated token, authentication token, digital certificate, decryption key, key derivation data, etc.) that enables delegated access to restricted-access portions of the requested customized system image 124. While not depicted in FIG. 7, intermediate OS 122 may reimage target device 104 based at least on the downloaded first restricted-access portion of the customized system image 124.

Figure 8:
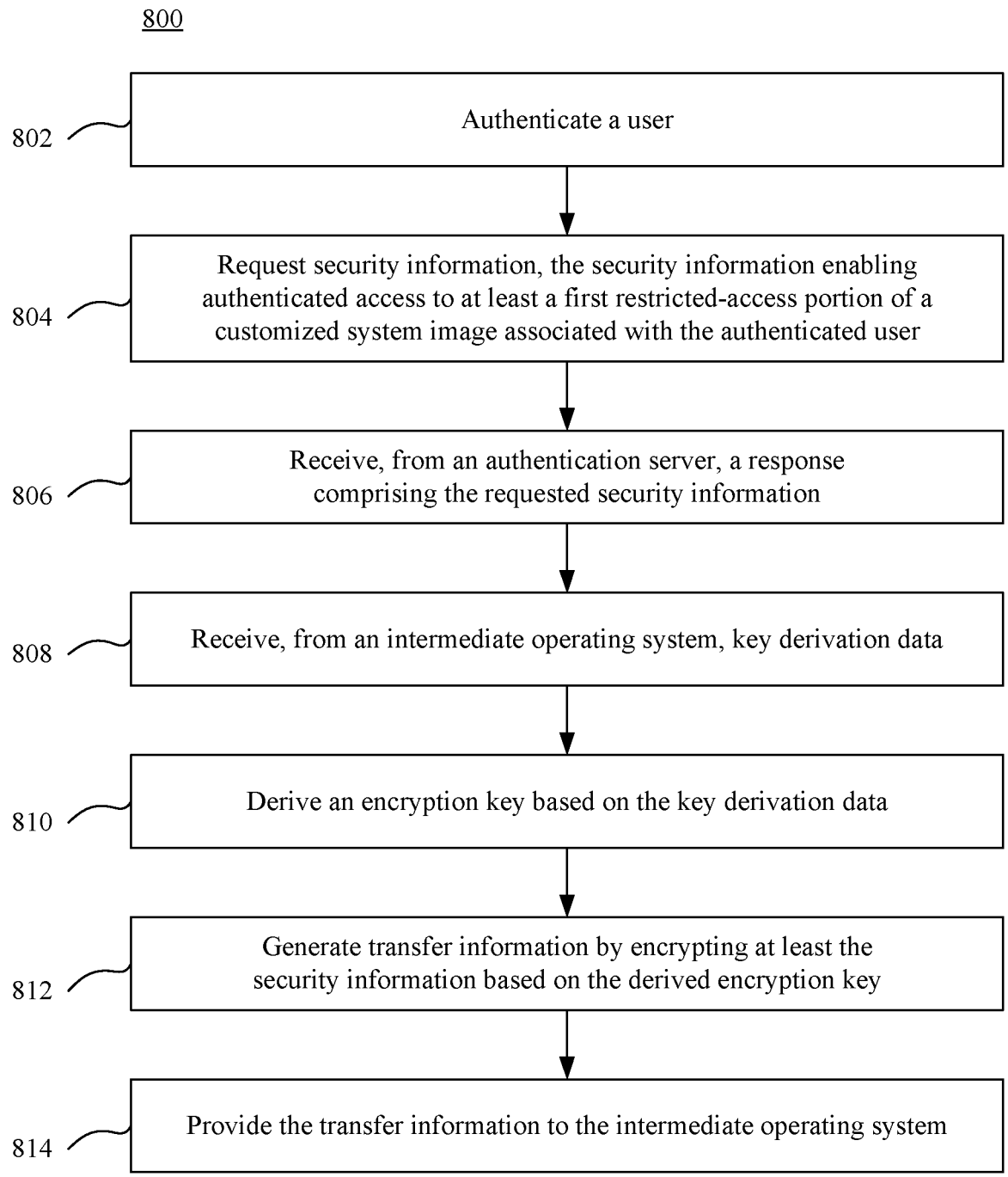
FIG. 8 depicts a flowchart of a process for performing a user presence check for delegating access to at least a portion of a customized system image, in accordance with an embodiment.

Embodiments described herein may operate in various ways to delegate access to at least a portion of a customized system image. FIG. 8 depicts a flowchart of a process for delegating access to at least a portion of a customized system image, in accordance with an embodiment. Mobile device 102, mobile application 112, network interface(s) 114, boot server 202, boot file 204, authenticator 206, DHCP service 208, file transfer service 210, camera 212, and/or microphone 214 of FIGS. 1 and/or 2 may operate according to flowchart 800, for example. Note that not all steps of flowchart 800 may need to be performed in all embodiments, and in some embodiments, the steps of flowchart 800 may be performed in different orders than shown. Flowchart 800 is described as follows with respect to FIGS. 1 and 2 for illustrative purposes.

Flowchart 800 starts at step 802. In step 802, a user is authenticated. For example, authenticator 206 may authenticate a user (e.g., teleworker). In embodiments, authenticator 206 may authenticate the user by providing, to authentication server(s) 224, various information, such as, but not limited to, a user identifier (e.g., username, employee id, alias, name, SSN, etc.), a user password, user biometric information (e.g., fingerprint, retina scan, face scan, palm scan, voice authentication, etc.), second-factor authentication (e.g., code generator, physical token, etc.), authentication token, digital certificate, location information, and/or any combination thereof. In embodiments, authentication server(s) 224 may, upon successful authentication of the user, return a user access token to mobile application 112.

In step 804, security information that enables authenticated access to at least a first restricted-access portion of a customized system image associated with the authenticated user is requested. For example, mobile application 112 may request security information that enables authenticated access to at least a first restricted-access portion of a customized system image 124. In embodiments, mobile application 112 may generate a request for delegated access to at least the first restricted-access portion of a customized system image 124, and transmit the request to authentication server(s) 224. The request may, in embodiments, include the user access token received upon successful authentication of the user. In embodiments, authentication server(s) 224 may process the request based on successful validation of the included user access token.

In step 806, a response comprising the requested security information is received from an authentication server. For example, mobile application 112 may receive a response from authentication server(s) 224 that includes the requested security information. In embodiments, the security information (e.g., delegated token, authentication token, digital certificate, decryption key, key derivation data, etc.) enables delegated access to restricted-access portions of the requested customized system image 124. In embodiments, authentication server(s) 224 may also provide, as part of the security information or separately, location information (e.g., server address, cloud location, etc.) associated with the access restricted-access portions of customized system image(s) 124.

In step 808, key derivation data is received from an intermediate operating system. For example, mobile application 112 may receive key derivation data from intermediate OS 122. As discussed above, mobile application 112 may receive the key derivation data from intermediate OS 122 through various means, including, but not limited to, scanning an image and/or text encoded with the key derivation data, decoding sound encoded with the key derivation data, receiving the key derivation data over a PAN, and/or receiving the key derivation data as user input on mobile device 102.

In step 810, an encryption key is derived based on the key derivation data. For example, mobile application 112 may derive an encryption key based on the key derivation data. In embodiments, mobile application 112 may derive the encryption key by providing key derivation data (e.g., seed data, random number, etc.) to a predetermined function. In other embodiments, the key derivation data is equivalent to the encryption key, where the encryption key is derived by simply reading or parsing the key derivation data.

In step 812, transfer information is generated by encrypting at least the security information based on the key derived encryption key. For example, mobile application 112 may generate transfer information by encrypting at least the security information based on the derive encryption key.

In step 814, the transfer information is provided to the intermediate operating system. For example, mobile application 112 may provide the transfer information to intermediate OS 122.

III. Example Mobile Device and Computer System Implementation

The systems and methods described above in reference to FIGS. 1-8, mobile device 102, target device 104, LAN 106, server(s) 108, network(s) 110, mobile application 112, network interface(s) 114, boot manager 116, network interface(s) 118, storage 120, intermediate OS 122, customized system image(s) 124, boot server 202, boot file 204, authenticator 206, boot service 208, TFTP service 210, camera 212, microphone 214, USB booter 216, network booter 218, display 220, speaker 222, authentication server 224, server(s) 226, base system boot image(s) 228, and/or each of the components described therein, and/or the steps of flowcharts 300, 400, 500, 600, 700 and/or 800 may be implemented in hardware, or hardware combined with one or both of software and/or firmware. For example, mobile device 102, target device 104, LAN 106, server(s) 108, network(s) 110, mobile application 112, network interface(s) 114, boot manager 116, network interface(s) 118, storage 120, intermediate OS 122, customized system image(s) 124, boot server 202, boot file 204, authenticator 206, boot service 208, TFTP service 210, camera 212, microphone 214, USB booter 216, network booter 218, display 220, speaker 222, authentication server 224, server(s) 226, base system boot image(s) 228, and/or each of the components described therein, and/or the steps of flowcharts 300, 400, 500, 600, 700 and/or 800 may be each implemented as computer program code/instructions configured to be executed in one or more processors and stored in a computer readable storage medium, and structured to performed the respective flowchart functions/operations. Alternatively, mobile device 102, target device 104, LAN 106, server(s) 108, network(s) 110, mobile application 112, network interface(s) 114, boot manager 116, network interface(s) 118, storage 120, intermediate OS 122, customized system image(s) 124, boot server 202, boot file 204, authenticator 206, boot service 208, TFTP service 210, camera 212, microphone 214, USB booter 216, network booter 218, display 220, speaker 222, authentication server 224, server(s) 226, base system boot image(s) 228, and/or each of the components described therein, and/or the steps of flowcharts 300, 400, 500, 600, 700 and/or 800 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
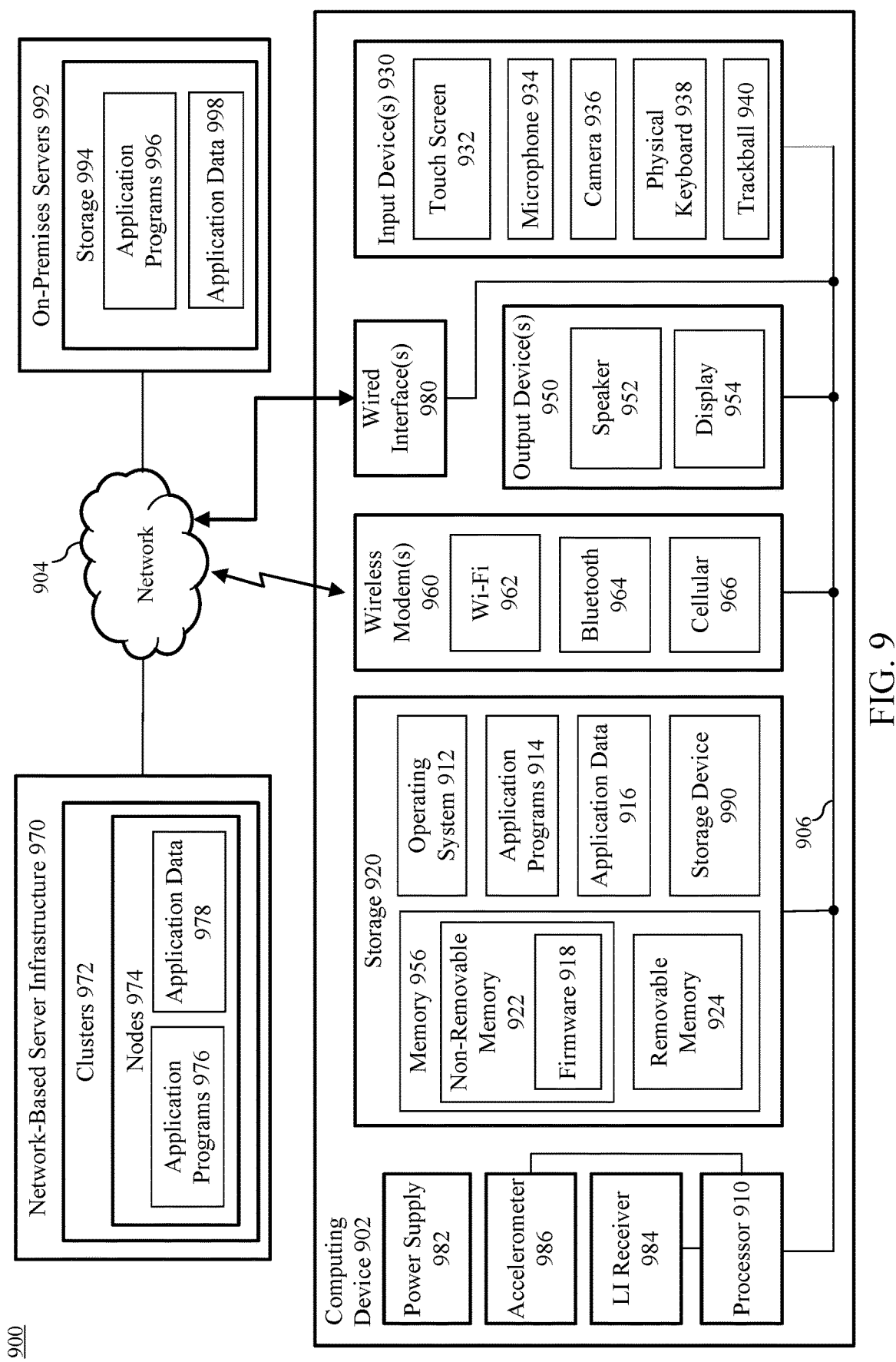
FIG. 9 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 9. FIG. 9 shows a block diagram of an exemplary computing environment 900 that includes a computing device 902. In some embodiments, computing device 902 is communicatively coupled with devices (not shown in FIG. 9) external to computing environment 900 via network 904. Network 904 comprises one or more networks such as local area networks (LANs), wide area networks (WANs), enterprise networks, the Internet, etc., and may include one or more wired and/or wireless portions. Network 904 may additionally or alternatively include a cellular network for cellular communications. Computing device 902 is described in detail as follows Computing device 902 can be any of a variety of types of computing devices. For example, computing device 902 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 902 may alternatively be a stationary computing device such as a desktop computer, a personal computer (PC), a stationary server device, a minicomputer, a mainframe, a supercomputer, etc.

As shown in FIG. 9, computing device 902 includes a variety of hardware and software components, including a processor 910, a storage 920, one or more input devices 930, one or more output devices 950, one or more wireless modems 960, one or more wired interfaces 980, a power supply 982, a location information (LI) receiver 984, and an accelerometer 986. Storage 920 includes memory 956, which includes non-removable memory 922 and removable memory 924, and a storage device 990. Storage 920 also stores an operating system 912, application programs 914, and application data 916. Wireless modem(s) 960 include a Wi-Fi modem 962, a Bluetooth modem 964, and a cellular modem 966. Output device(s) 950 includes a speaker 952 and a display 954. Input device(s) 930 includes a touch screen 932, a microphone 934, a camera 936, a physical keyboard 938, and a trackball 940. Not all components of computing device 902 shown in FIG. 9 are present in all embodiments, additional components not shown may be present, and any combination of the components may be present in a particular embodiment. These components of computing device 902 are described as follows.

A single processor 910 (e.g., central processing unit (CPU), microcontroller, a microprocessor, signal processor, ASIC (application specific integrated circuit), and/or other physical hardware processor circuit) or multiple processors 910 may be present in computing device 902 for performing such tasks as program execution, signal coding, data processing, input/output processing, power control, and/or other functions. Processor 910 may be a single-core or multi-core processor, and each processor core may be single-threaded or multithreaded (to provide multiple threads of execution concurrently). Processor 910 is configured to execute program code stored in a computer readable medium, such as program code of operating system 912 and application programs 914 stored in storage 920. Operating system 912 controls the allocation and usage of the components of computing device 902 and provides support for one or more application programs 914 (also referred to as "applications" or "apps"). Application programs 914 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 902 can communicate with any other component according to function, although not all connections are shown for ease of illustration. For instance, as shown in FIG. 9, bus 906 is a multiple signal line communication medium (e.g., conductive traces in silicon, metal traces along a motherboard, wires, etc.) that may be present to communicatively couple processor 910 to various other components of computing device 902, although in other embodiments, an alternative bus, further buses, and/or one or more individual signal lines may be present to communicatively couple components. Bus 906 represents one or more of any of several types of bus structures, including a memory bus or memory controller, a peripheral bus, an accelerated graphics port, and a processor or local bus using any of a variety of bus architectures.

Storage 920 is physical storage that includes one or both of memory 956 and storage device 990, which store operating system 912, application programs 914, and application data 916 according to any distribution. Non-removable memory 922 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 922 may include main memory and may be separate from or fabricated in a same integrated circuit as processor 910. As shown in FIG. 9, non-removable memory 922 stores firmware 918, which may be present to provide low-level control of hardware. Examples of firmware 918 include BIOS (Basic Input/Output System, such as on personal computers) and boot firmware (e.g., on smart phones). Removable memory 924 may be inserted into a receptacle of or otherwise coupled to computing device 902 and can be removed by a user from computing device 902. Removable memory 924 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 990 may be present that are internal and/or external to a housing of computing device 902 and may or may not be removable. Examples of storage device 990 include a hard disk drive, a SSD, a thumb drive (e.g., a USB (Universal Serial Bus) flash drive), or other physical storage device.

One or more programs may be stored in storage 920. Such programs include operating system 912, one or more application programs 914, and other program modules and program data. Examples of such application programs may include, for example, computer program logic (e.g., computer program code/instructions) for implementing one or more of mobile device 102, target device 104, LAN 106, server(s) 108, network(s) 110, mobile application 112, network interface(s) 114, boot manager 116, network interface(s) 118, storage 120, intermediate OS 122, customized system image(s) 124, boot server 202, boot file 204, authenticator 206, boot service 208, TFTP service 210, camera 212, microphone 214, USB booter 216, network booter 218, display 220, speaker 222, authentication server 224, server(s) 226, base system boot image(s) 228, along with any components and/or subcomponents thereof, as well as the flowcharts/flow diagrams (e.g., flowcharts 300, 400, 500, 600, 700 and/or 800) described herein, including portions thereof, and/or further examples described herein.

Storage 920 also stores data used and/or generated by operating system 912 and application programs 914 as application data 916. Examples of application data 916 include web pages, text, images, tables, sound files, video data, and other data, which may also be sent to and/or received from one or more network servers or other devices via one or more wired or wireless networks. Storage 920 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 902 through one or more input devices 930 and may receive information from computing device 902 through one or more output devices 950. Input device(s) 930 may include one or more of touch screen 932, microphone 934, camera 936, physical keyboard 938 and/or trackball 940 and output device(s) 950 may include one or more of speaker 952 and display 954. Each of input device(s) 930 and output device(s) 950 may be integral to computing device 902 (e.g., built into a housing of computing device 902) or external to computing device 902 (e.g., communicatively coupled wired or wirelessly to computing device 902 via wired interface(s) 980 and/or wireless modem(s) 960). Further input devices 930 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 954 may display information, as well as operating as touch screen 932 by receiving user commands and/or other information (e.g., by touch, finger gestures, virtual keyboard, etc.) as a user interface. Any number of each type of input device(s) 930 and output device(s) 950 may be present, including multiple microphones 934, multiple cameras 936, multiple speakers 952, and/or multiple displays 954.

One or more wireless modems 960 can be coupled to antenna(s) (not shown) of computing device 902 and can support two-way communications between processor 910 and devices external to computing device 902 through network 904, as would be understood to persons skilled in the relevant art(s). Wireless modem 960 is shown generically and can include a cellular modem 966 for communicating with one or more cellular networks, such as a GSM network for data and voice communications within a single cellular network, between cellular networks, or between the mobile device and a public switched telephone network (PSTN). Wireless modem 960 may also or alternatively include other radio-based modem types, such as a Bluetooth modem 964 (also referred to as a "Bluetooth device") and/or Wi-Fi modem 962 (also referred to as an "wireless adaptor"). Wi-Fi modem 962 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 964 is configured to communicate with another Bluetooth-capable device according to the Bluetooth short-range wireless technology standard(s) such as IEEE 802.15.1 and/or managed by the Bluetooth Special Interest Group (SIG).

Computing device 902 can further include power supply 982, LI receiver 984, accelerometer 986, and/or one or more wired interfaces 980. Example wired interfaces 980 include a USB port, IEEE 1394 (Fire Wire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 980 of computing device 902 provide for wired connections between computing device 902 and network 904, or between computing device 902 and one or more devices/peripherals when such devices/peripherals are external to computing device 902 (e.g., a pointing device, display 954, speaker 952, camera 936, physical keyboard 938, etc.). Power supply 982 is configured to supply power to each of the components of computing device 902 and may receive power from a battery internal to computing device 902, and/or from a power cord plugged into a power port of computing device 902 (e.g., a USB port, an A/C power port). LI receiver 984 may be used for location determination of computing device 902 and may include a satellite navigation receiver such as a Global Positioning System (GPS) receiver or may include other type of location determiner configured to determine location of computing device 902 based on received information (e.g., using cell tower triangulation, etc.). Accelerometer 986 may be present to determine an orientation of computing device 902.

Note that the illustrated components of computing device 902 are not required or all-inclusive, and fewer or greater numbers of components may be present as would be recognized by one skilled in the art. For example, computing device 902 may also include one or more of a gyroscope, barometer, proximity sensor, ambient light sensor, digital compass, etc. Processor 910 and memory 956 may be co-located in a same semiconductor device package, such as being included together in an integrated circuit chip, FPGA, or system-on-chip (SOC), optionally along with further components of computing device 902.

In embodiments, computing device 902 is configured to implement any of the above-described features of flowcharts herein. Computer program logic for performing any of the operations, steps, and/or functions described herein may be stored in storage 920 and executed by processor 910.

In some embodiments, server infrastructure 970 may be present in computing environment 900 and may be communicatively coupled with computing device 902 via network 904. Server infrastructure 970, when present, may be a network-accessible server set (e.g., a cloud-based environment or platform). As shown in FIG. 9, server infrastructure 970 includes clusters 972. Each of clusters 972 may comprise a group of one or more compute nodes and/or a group of one or more storage nodes. For example, as shown in FIG. 9, cluster 972 includes nodes 974. Each of nodes 974 are accessible via network 904 (e.g., in a "cloud-based" embodiment) to build, deploy, and manage applications and services. Any of nodes 974 may be a storage node that comprises a plurality of physical storage disks, SSDs, and/or other physical storage devices that are accessible via network 904 and are configured to store data associated with the applications and services managed by nodes 974. For example, as shown in FIG. 9, nodes 974 may store application data 978.

Each of nodes 974 may, as a compute node, comprise one or more server computers, server systems, and/or computing devices. For instance, a node 974 may include one or more of the components of computing device 902 disclosed herein. Each of nodes 974 may be configured to execute one or more software applications (or "applications") and/or services and/or manage hardware resources (e.g., processors, memory, etc.), which may be utilized by users (e.g., customers) of the network-accessible server set. For example, as shown in FIG. 9, nodes 974 may operate application programs 976. In an implementation, a node of nodes 974 may operate or comprise one or more virtual machines, with each virtual machine emulating a system architecture (e.g., an operating system), in an isolated manner, upon which applications such as application programs 976 may be executed.

In an embodiment, one or more of clusters 972 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 972 may be a datacenter in a distributed collection of datacenters. In embodiments, exemplary computing environment 900 comprises part of a cloud-based platform such as Amazon Web Services® of Amazon Web Services, Inc. or Google Cloud Platform™ of Google LLC, although these are only examples and are not intended to be limiting.

In an embodiment, computing device 902 may access application programs 976 for execution in any manner, such as by a client application and/or a browser at computing device 902. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 902 may additionally and/or alternatively synchronize copies of application programs 914 and/or application data 916 to be stored at network-based server infrastructure 970 as application programs 976 and/or application data 978. For instance, operating system 912 and/or application programs 914 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 920 at network-based server infrastructure 970.

In some embodiments, on-premises servers 992 may be present in computing environment 900 and may be communicatively coupled with computing device 902 via network 904. On-premises servers 992, when present, are hosted within an organization's infrastructure and, in many cases, physically onsite of a facility of that organization. On-premises servers 992 are controlled, administered, and maintained by IT (Information Technology) personnel of the organization or an IT partner to the organization. Application data 998 may be shared by on-premises servers 992 between computing devices of the organization, including computing device 902 (when part of an organization) through a local network of the organization, and/or through further networks accessible to the organization (including the Internet). Furthermore, on-premises servers 992 may serve applications such as application programs 996 to the computing devices of the organization, including computing device 902. Accordingly, on-premises servers 992 may include storage 994 (which includes one or more physical storage devices such as storage disks and/or SSDs) for storage of application programs 996 and application data 998 and may include one or more processors for execution of application programs 996. Still further, computing device 902 may be configured to synchronize copies of application programs 914 and/or application data 916 for backup storage at on-premises servers 992 as application programs 996 and/or application data 998.

Embodiments described herein may be implemented in one or more of computing device 902, network-based server infrastructure 970, and on-premises servers 992. For example, in some embodiments, computing device 902 may be used to implement systems, clients, or devices, or components/subcomponents thereof, disclosed elsewhere herein. In other embodiments, a combination of computing device 902, network-based server infrastructure 970, and/or on-premises servers 992 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 920. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 914) may be stored in storage 920. Such computer programs may also be received via wired interface(s) 980 and/or wireless modem(s) 960 over network 904. Such computer programs, when executed or loaded by an application, enable computing device 902 to implement features of embodiments discussed herein. Accordingly, such computer programs represent controllers of the computing device 902.

Embodiments are also directed to computer program products comprising computer code or instructions stored on any computer-readable medium or computer-readable storage medium. Such computer program products include the physical storage of storage 920 as well as further physical storage types.

IV. Additional Example Embodiments

In an embodiment, a mobile device comprises: a processor; and a memory device that stores program code structured to cause the processor to: provide, to a target device, a boot file configured to execute an intermediate operating system; determine, based on a user presence check, that the target device is in proximity to the mobile device; and responsive to determining that the target device is in proximity to the mobile device, provide, to the intermediate operating system, transfer information associated with at least a first restricted-access portion of a customized system image to cause the intermediate operating system to obtain the first restricted-access portion of the customized system image and reimage the target device based at least on the first restricted-access portion of the customized system image.

In an embodiment, to provide the boot file to the target device, the program code is further structured to cause the processor to perform at least one of: host a boot server to serve the boot file based on a file transfer protocol; transfer the boot file to a storage device connectable to the target device; or provide location information identifying a download source for the boot file.

In an embodiment, the program code is further structured to cause the processor to: obtain, during the user presence check, key derivation data from the intermediate operating system; derive an encryption key based on the key derivation data; and generate the transfer information based on the encryption key.

In an embodiment, to obtain the key derivation data, the program code is further structured to cause the processor to perform at least one of: scan an image encoded the key derivation data and displayed, by the intermediate operating system, on a display associated with the target device; receive the key derivation data over a personal area network (PAN); detect an audio signal encoded with the key derivation data; or receive user input of the key derivation data, the key derivation data displayed, by the intermediate operating system, on a display associated with the target device.

In an embodiment, the program code is further structured to cause the processor to: authenticate a user; and request security information, the security information enabling authenticated access of the first restricted-access portion of the customized system image at a system image server, wherein the transfer information comprises location information associated with the system image server and the security information.

In an embodiment, the program code is further structured to cause the processor to: obtain, during the user presence check, key derivation data from the intermediate operating system; derive an encryption key based on the key derivation data; and generate the transfer information by encrypting at least the security information based on the derived encryption key, wherein said provide, to the intermediate operating system, transfer information further causes the intermediate operating system to decrypt, based on a decryption key derived from the key derivation data, the transfer information to obtain the security information, and download the first restricted-access portion of the customized system image based at least on the security information.

In an embodiment, the customized system image comprises at least one of: a system image customized for the authenticated user; a system image customized for a group or role associated with the authenticated user; a system image that includes a set of applications specific to the authenticated user; a system image that includes a set of applications specific for a group or role associated with the authenticated user; a system image that incorporates user settings for a group or role associated with the authenticated user; or a system image that incorporates user preferences associated with the authenticated user.

In an embodiment, providing, to the intermediate operating system, transfer information further causes the intermediate operating system to: download, from a publicly accessible source, a second publicly accessible portion of the customized system image, the second publicly accessible portion of the customized system image comprising a base system image.

In an embodiment, a method comprises: providing, by a mobile device, a boot file to a target device, the boot file configured execute an intermediate operating system on the target device; determining, based on a user presence check, that the target device is in proximity to the mobile device; and responsive to determining that the target device is in proximity to the mobile device, providing, to the intermediate operating system, transfer information associated with at least a first restricted-access portion of a customized system image to cause the intermediate operating system to obtain the first restricted-access portion of the customized system image and reimage the target device based at least on the first restricted-access portion of the customized system image.

In an embodiment, providing, by the mobile device, the boot file to the target device comprises at least one of: hosting, by the mobile device, a boot server to serve the boot file over a network; transferring, by the mobile device, the boot file to a storage device connectable to the target device; or providing, by the mobile device, location information identifying a download source for the boot file.

In an embodiment, the method further comprises: obtaining, by the mobile application during the user presence check, key derivation data from the intermediate operating system; deriving, by the mobile application, an encryption key based on the key derivation data; and generating, by the mobile application, the transfer information based on the encryption key.

In an embodiment, obtaining, by the mobile application, key derivation data from the intermediate operating system comprises at least one of: scanning an image encoded with the key derivation data and displayed, by the intermediate operating system, on a display associated with the target device; receiving the key derivation data over a personal area network (PAN); detecting an audio signal encoded with the key derivation data; or receiving user input of the key derivation data, the key derivation data displayed, by the intermediate operating system, on the display associated with the target device.

In an embodiment, the method further comprises: authenticating, by the mobile application, a user; and requesting, by the mobile application, security information, the security information enabling authenticated access of the first restricted-access portion of the customized system image at a system image server, wherein the transfer information comprises location information associated with the system image server and the security information.

In an embodiment, providing, to the intermediate operating system, transfer information further causes the intermediate operating system to: download, from a publicly accessible source, a second publicly accessible portion of the customized system image, the second publicly accessible portion of the customized system image comprising a base system image.

In an embodiment, a computer-readable storage medium comprises computer-executable instructions that, when executed by a processor of a mobile device, cause the processor to: provide, to a target device, a boot file configured to execute an intermediate operating system; determine, based on a user presence check, that the target device is in proximity to the mobile device; and responsive to determining that the target device is in proximity to the mobile device, provide, to the intermediate operating system, transfer information associated with at least a first restricted-access portion of a customized system image to cause the intermediate operating system to obtain the first restricted-access portion of the customized system image and reimage the target device based at least on the first restricted-access portion of the customized system image.

In an embodiment, to provide the boot file to the target device, the computer-executable instructions, when executed by the processor, further cause the processor to at least one of: host, on the mobile device, a boot server to serve the boot file based on a file transfer protocol; transfer, from the mobile device, the boot file to a storage device connectable to the target device; or provide, by the mobile device, location information identifying a download source for the boot file.

In an embodiment, the computer-executable instructions, when executed by the processor, further cause the processor to: obtain, during the user presence check, key derivation data from the intermediate operating system; derive an encryption key based on the key derivation data; and generate the transfer information based on the encryption key.

In an embodiment, to obtain the encryption key from the intermediate operating system, the computer-executable instructions, when executed by the processor, further cause the processor to at least one of: scan an image encoded the key derivation data and displayed, by the intermediate operating system, on a display associated with the target device; receive the key derivation data over a personal area network (PAN); detect an audio signal encoded with the key derivation data; or receive user input of the key derivation data displayed by the intermediate operating system on a display associated with the target device.

In an embodiment, the computer-executable instructions, when executed by the processor, further cause the processor to: authenticate a user; and request security information, the security information enabling authenticated access of the first restricted-access portion of the customized system image at a system image server, wherein the transfer information comprises location information associated with the system image server and the security information.

In an embodiment, the customized system image comprises at least one of: a system image customized for the authenticated user; a system image customized for a group or role associated with the authenticated user; a system image that includes a set of applications specific to the authenticated user; a system image that includes a set of applications specific to a group or role associated with the authenticated user; a system image that incorporates user settings for a group or role associated with the authenticated user; or a system image that incorporates user preferences associated with the authenticated user.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed:

1. A mobile device comprising:
a processor; and
a memory device that stores program code structured to cause the processor to:
provide, to a target device, a boot file configured to execute an intermediate operating system;
determine, based on a user presence check, that the target device is in proximity to the mobile device; and
responsive to determining that the target device is in proximity to the mobile device, provide, to the intermediate operating system, transfer information associated with at least a first restricted-access portion of a customized system image to cause the intermediate operating system to obtain the first restricted-access portion of the customized system image and reimage the target device based at least on the first restricted-access portion of the customized system image.

2. The mobile device of claim 1, wherein, to provide the boot file to the target device, the program code is further structured to cause the processor to perform at least one of:
host a boot server to serve the boot file based on a file transfer protocol;
transfer the boot file to a storage device connectable to the target device; or
provide location information identifying a download source for the boot file.

3. The mobile device of claim 1, wherein the program code is further structured to cause the processor to:
obtain, during the user presence check, key derivation data from the intermediate operating system;
derive an encryption key based on the key derivation data; and
generate the transfer information based on the encryption key.

4. The mobile device of claim 3, wherein, to obtain the key derivation data, the program code is further structured to cause the processor to perform at least one of:
scan an image encoded the key derivation data and displayed, by the intermediate operating system, on a display associated with the target device;
receive the key derivation data over a personal area network (PAN);
detect an audio signal encoded with the key derivation data; or
receive user input of the key derivation data, the key derivation data displayed, by the intermediate operating system, on a display associated with the target device.

5. The mobile device of claim 1, wherein the program code is further structured to cause the processor to:
authenticate a user; and
request security information, the security information enabling authenticated access of the first restricted-access portion of the customized system image at a system image server,
wherein the transfer information comprises location information associated with the system image server and the security information.

6. The mobile device of claim 5, wherein the program code is further structured to cause the processor to:
obtain, during the user presence check, key derivation data from the intermediate operating system;
derive an encryption key based on the key derivation data; and
generate the transfer information by encrypting at least the security information based on the derived encryption key,
wherein said provide, to the intermediate operating system, transfer information further causes the intermediate operating system to decrypt, based on a decryption key derived from the key derivation data, the transfer information to obtain the security information, and download the first restricted-access portion of the customized system image based at least on the security information.

7. The mobile device of claim 5, wherein the customized system image comprises at least one of:
a system image customized for the authenticated user;
a system image customized for a group or role associated with the authenticated user;
a system image that includes a set of applications specific to the authenticated user;
a system image that includes a set of applications specific for a group or role associated with the authenticated user;
a system image that incorporates user settings for a group or role associated with the authenticated user; or
a system image that incorporates user preferences associated with the authenticated user.

8. The mobile device of claim 1, wherein said provide, to the intermediate operating system, transfer information further causes the intermediate operating system to:
download, from a publicly accessible source, a second publicly accessible portion of the customized system image, the second publicly accessible portion of the customized system image comprising a base system image.

9. A method comprising:
providing, by a mobile device, a boot file to a target device, the boot file configured execute an intermediate operating system on the target device;
determining, based on a user presence check, that the target device is in proximity to the mobile device; and
responsive to determining that the target device is in proximity to the mobile device, providing, to the intermediate operating system, transfer information associated with at least a first restricted-access portion of a customized system image to cause the intermediate operating system to obtain the first restricted-access portion of the customized system image and reimage the target device based at least on the first restricted-access portion of the customized system image.

10. The method of claim 9, wherein said providing, by the mobile device, the boot file to the target device comprises at least one of:
hosting, by the mobile device, a boot server to serve the boot file over a network;
transferring, by the mobile device, the boot file to a storage device connectable to the target device; or
providing, by the mobile device, location information identifying a download source for the boot file.

11. The method of claim 9, further comprising:
obtaining, by the mobile device during the user presence check, key derivation data from the intermediate operating system;
deriving, by the mobile device, an encryption key based on the key derivation data; and
generating, by the mobile device, the transfer information based on the encryption key.

12. The method of claim 11, wherein said obtaining, by the mobile device, key derivation data from the intermediate operating system comprises at least one of:
scanning an image encoded with the key derivation data and displayed, by the intermediate operating system, on a display associated with the target device;
receiving the key derivation data over a personal area network (PAN);
detecting an audio signal encoded with the key derivation data; or
receiving user input of the key derivation data, the key derivation data displayed, by the intermediate operating system, on the display associated with the target device.

13. The method of claim 9, further comprising:
authenticating, by the mobile device, a user; and
requesting, by the mobile device, security information, the security information enabling authenticated access of the first restricted-access portion of the customized system image at a system image server,
wherein the transfer information comprises location information associated with the system image server and the security information.

14. The method of claim 9, wherein said providing, to the intermediate operating system, transfer information further causes the intermediate operating system to:
download, from a publicly accessible source, a second publicly accessible portion of the customized system image, the second publicly accessible portion of the customized system image comprising a base system image.

15. A non-transitory computer-readable storage medium comprising computer-executable instructions that, when executed by a processor of a mobile device, cause the processor to:
provide, to a target device, a boot file configured to execute an intermediate operating system;
determine, based on a user presence check, that the target device is in proximity to the mobile device; and
responsive to determining that the target device is in proximity to the mobile device, provide, to the intermediate operating system, transfer information associated with at least a first restricted-access portion of a customized system image to cause the intermediate operating system to obtain the first restricted-access portion of the customized system image and reimage the target device based at least on the first restricted-access portion of the customized system image.

16. The non-transitory computer-readable storage medium of claim 15, wherein, to provide the boot file to the target device, the computer-executable instructions, when executed by the processor, further cause the processor to at least one of:
host, on the mobile device, a boot server to serve the boot file based on a file transfer protocol;
transfer, from the mobile device, the boot file to a storage device connectable to the target device; or
provide, by the mobile device, location information identifying a download source for the boot file.

17. The non-transitory computer-readable storage medium of claim 15, wherein the computer-executable instructions, when executed by the processor, further cause the processor to:
obtain, during the user presence check, key derivation data from the intermediate operating system;
derive an encryption key based on the key derivation data; and
generate the transfer information based on the encryption key.

18. The non-transitory computer-readable storage medium of claim 17, wherein, to obtain the encryption key from the intermediate operating system, the computer-executable instructions, when executed by the processor, further cause the processor to at least one of:
scan an image encoded the key derivation data and displayed, by the intermediate operating system, on a display associated with the target device;
receive the key derivation data over a personal area network (PAN);
detect an audio signal encoded with the key derivation data; or
receive user input of the key derivation data displayed by the intermediate operating system on a display associated with the target device.

19. The non-transitory computer-readable storage medium of claim 15, wherein the computer-executable instructions, when executed by the processor, further cause the processor to:
authenticate a user; and
request security information, the security information enabling authenticated access of the first restricted-access portion of the customized system image at a system image server,
wherein the transfer information comprises location information associated with the system image server and the security information.

20. The non-transitory computer-readable storage medium of claim 19, wherein the customized system image comprises at least one of:
a system image customized for the authenticated user;
a system image customized for a group or role associated with the authenticated user;
a system image that includes a set of applications specific to the authenticated user;
a system image that includes a set of applications specific to a group or role associated with the authenticated user;
a system image that incorporates user settings for a group or role associated with the authenticated user; or
a system image that incorporates user preferences associated with the authenticated user.

* * * * *